April 19, 1927.
C. F. SMITH ET AL
1,624,989
COOKER
Filed July 25, 1924 3 Sheets-Sheet 1
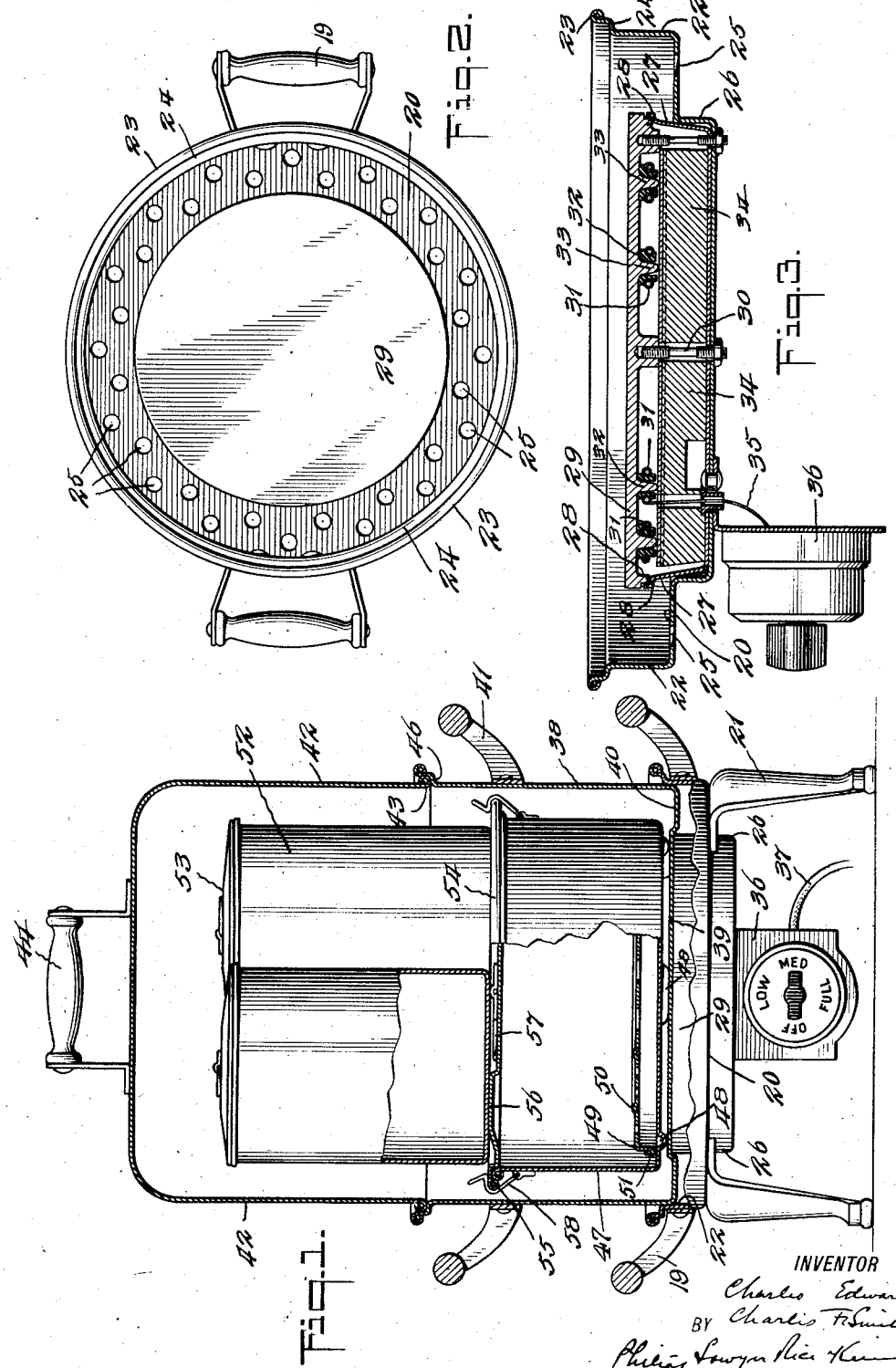
INVENTOR
Charles Edwards,
BY Charles F Smith
Philips, Sawyer, Rice & Kennedy
ATTORNEY

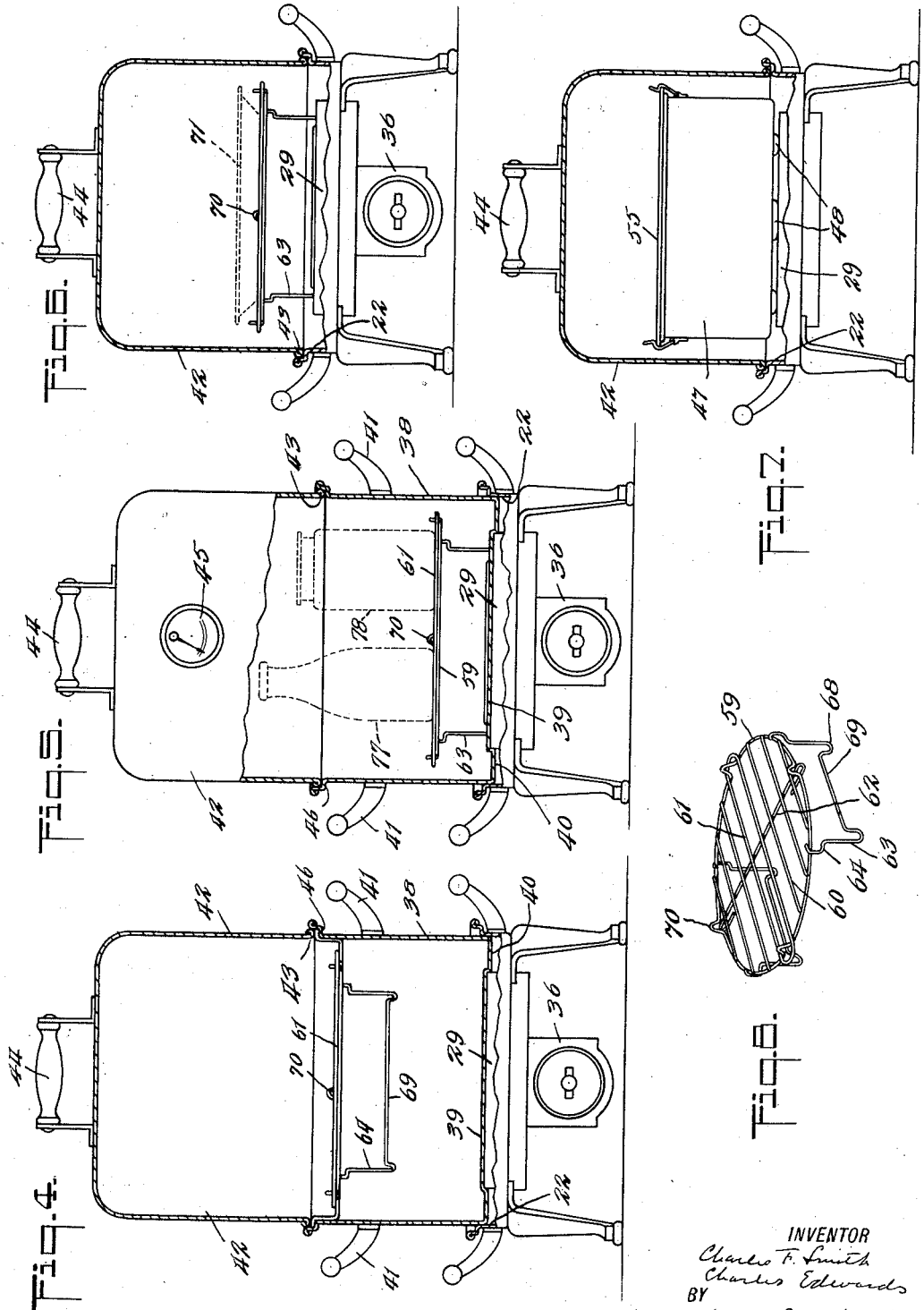

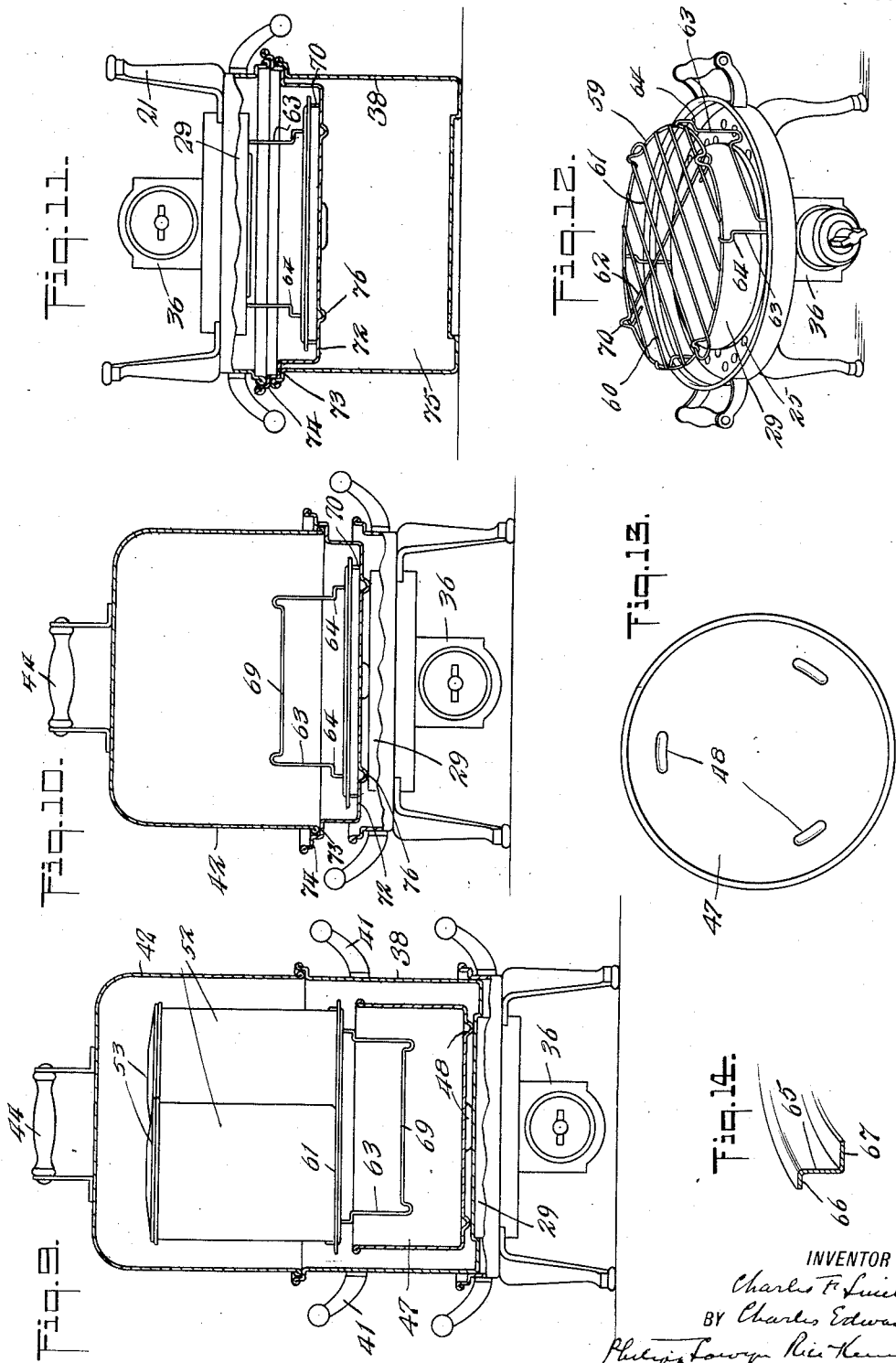

Patented Apr. 19, 1927.

1,624,989

UNITED STATES PATENT OFFICE.

CHARLES F. SMITH AND CHARLES EDWARDS, OF NEW BRITAIN, CONNECTICUT, ASSIGNORS TO LANDERS, FRARY & CLARK, OF NEW BRITAIN, CONNECTICUT, A CORPORATION OF CONNECTICUT.

COOKER.

Application filed July 25, 1924. Serial No. 728,207.

This invention relates to cookers and more particularly to electric cookers.

It is the principal object of the invention to provide a simple, compact, readily portable cooker that is capable of fulfilling substantially all the requirements of domestic cooking, and that is available for use wherever it can be connected into the usual lighting and power circuit.

With this general object in view the invention consists in the features, combinations, details of construction and arrangement of parts which will first be described in connection with the accompanying drawings and then more particularly pointed out.

In the drawings—

Fig. 1 is a view, partly in side elevation and partly in vertical section, of a cooker constructed in accordance with the invention, showing one arrangement of the parts;

Fig. 2 is a plan view of the supporting base and hot-plate;

Fig. 3 is an enlarged view of the same in vertical section;

Figs. 4 to 7 inclusive are explanatory views illustrating more or less diagrammatically various arrangements and uses of the cooker;

Fig. 8 is a perspective view of a supplemental rack element;

Figs. 9 to 11 inclusive are explanatory views like Figs. 4 to 7 illustrating further arrangements and uses;

Fig. 12 is a perspective view of the supporting base with the rack in place thereon;

Fig. 13 is a bottom plan view of one of the supplemental parts; and,

Fig. 14 is a sectional view of a supplemental ring.

Referring to the drawings, there is provided a supporting base, a heating element, and means for forming an oven chamber. The invention in its entirety includes a base, having provision for an air circulation and oven elements adapted to be associated with the base for providing an oven chamber closed to air circulation for certain kinds of cooking and an oven chamber open to the air circulation for other kinds of cooking. This may be accomplished, for example, by an oven-kettle and an oven-hood, the two combined forming the closed oven chamber, the oven-hood alone with the base forming an open oven chamber.

While the base may vary in construction, as here shown as an example, the base comprises an annular base plate 20 to which is secured a plurality of elevating legs 21 for supporting the base plate from a table or the like. Extending upwardly from the outer edge of the base plate is a vertical wall 22 having an offset beaded rim 23 providing an annular shoulder 24 for a purpose hereinafter described. To provide the air circulation later referred to, the base plate is provided with a number of staggered perforations 25 (Fig. 2). A pair of handles 19 secured to wall 22 enable the base to be moved about.

Carried by the supporting base is a heating element and in structures embodying the invention to the best advantage the heating element is an exposed prominent hot-plate. As here shown as an example, within the annulus of the base plate 20 and formed integral therewith is a cupped holder 26 which receives a cup shaped support 27, the wall of which extends above the base plate 20. The rim of this wall is shouldered (Fig. 3) to receive an annular flange 28 formed on a hot-plate 29. This hot-plate is a round solid exposed plate, its outer edge extending above the rim of support 27 and well above the base plate. Hot-plate, support and holder are connected together by bolts 30 for securing the parts in place.

While the hot-plate may be heated in any suitable manner, as here shown as an example, it is electrically heated by means of electric resistance elements 31 coiled about electric insulating elements 32 which embrace lugs 33 formed on the under side of the hot-plate. Between the hot-plate and the bottom of support 27 is an insulating block 34. The electric resistance elements, which are housed by the hot-plate and the cup shaped support, are connected by conductors, conventionally indicated at 35, with a switch 36 on the base. As indicated in Fig. 1, this switch is arranged to give three heating steps, namely, low, medium and high, and to have a "current-off" position. As such switches are well known in the art no further description is necessary.

Also connected with the switch is a cable 37 for connection with a current source, for example, a lamp socket or wall socket of the ordinary household wiring system. The cable may have the usual connecting plug (not shown). As will now be apparent, the heat set up in the electric resistance elements heats the hot-plate for carrying on the various cooking operations to be described.

While the oven-kettle may vary in construction and may be supported by the base in various ways, as here shown as an example, the oven-kettle is constructed to seat on the hot-plate and in a manner to provide high heat efficiency. The oven-kettle shown comprises a cylindrical container 38 having an open top and a closed bottom. The bottom has a portion 39 struck-up inwardly, this portion corresponding in diameter to the hot-plate 29. To removably support the oven-kettle on the base, the dished portion 39 is seated on the hot-plate, the annular portion 40 of the bottom overhanging the prominent edge of the hot-plate and substantially filling the annular space between the hot-plate and the wall 22 of the base, as appears in Fig. 1. The oven-kettle is provided with a pair of handles 41 by which it may be moved about.

The oven-hood here shown as an example, is a separate cylindrical hood 42 of substantially the same diameter as the oven-kettle, having a closed top and an open bottom provided with a beaded rim 43. The oven-kettle and oven-hood are of a height to permit carrying out, either separately or combined, the various cooking processes later referred to. The oven-hood is provided with a handle 44 and a temperature indicator, indicated conventionally at 45.

While the oven-hood may be combined with the oven-kettle in any suitable manner, as here shown as an example, the rim of the oven-kettle is offset to provide a shoulder 46 of a diameter corresponding to the rim 43 of the oven-hood, whereby the latter may seat on the shoulder 46 (Fig. 1).

With the oven-kettle seated on the hot-plate, as above described, and the oven-hood seated on the shoulder of the oven-kettle (Fig. 1), there is provided a combined oven chamber and one that is closed to air circulation through perforations 25 by the solid bottom of the oven-kettle. This arrangement of the parts adapts the cooker to certain cooking operations, such as boiling and steaming, as hereinafter referred to. With the oven-kettle seated on the hot-plate and having a portion overhanging the edge thereof and substantially filling the space between the hot-plate and the base wall, wasteful loss of heat is avoided.

As above stated, a open oven chamber may be formed by means of the oven-hood and base. In the present embodiment, the shoulder 24 is of substantially the same diameter as shoulder 46, i. e., it corresponds to the diameter of the rim 43 of the oven-hood. The oven-kettle being removed, the oven-hood may be seated on the shoulder 24 of the base. Thus the oven-hood with the base, provides a single and smaller oven chamber that is open to air circulation through perforations 25, as the latter are within the periphery of the wall 22. This arrangement of the parts adapts the cooker to other cooking operations, such as baking and roasting, as later described.

The base, carrying the heating element, the oven-kettle and the oven-hood comprise three principal cooker elements. In connection with these principal elements, the invention in its entirety includes certain supplemental parts and utensils. By virtue of the construction of these principal and supplemental parts and by various arrangements thereof the cooker is readily adapted to substantially all kinds of cooking.

For simultaneously cooking meat and a number of vegetables there is provided means for supporting a plurality of vegetable containers in the combined oven chamber far enough above the bottom thereof to leave space for the meat. While the meat may be supported in various ways, in structures embodying the invention to the best advantage there is provided a meat pan dimensioned to be received by either oven chamber. As here illustrated as an example, meat may be cooked in a meat pan comprising a cylindrical container 47 of diameter and height to be readily received within either the oven-kettle or the oven-hood.

There is provided means by which the meat pan may be elevated above the surface which supports it, e. g., the bottom of the oven-kettle. As here shown as an example, the meat pan has a plurality of integral elevating feet 48 formed by striking-up the metal of the pan bottom outwardly into a plurality of bead-like knobs. As shown in Fig. 1 these feet rest on the bottom of the oven-kettle and elevate the pan sufficiently to permit a heat circulation below and around the same. With the construction described this is accomplished in a simple and economical manner and without the use of extra parts.

There is provided means for supporting meat in the pan and above the bottom thereof. As here shown as an example, removably mounted in the bottom of the meat pan is an elevating grid in the form of a perforated plate 49 having a plurality of annular beads 50 and having a down-turned flange 51 which rests on the bottom of the meat pan to support the grid in elevated position. The grid 49, placed in the meat pan, as shown in Fig. 1, provides a suitable support for the meat to be cooked.

With the meat pan inserted in the combined oven chamber there is room above the meat pan for a number of vegetable containers. While these may vary in construction, as here illustrated as an example, there is provided a vegetable set comprising three cylindrical containers 52 having removable lids 53. These containers are conveniently all alike and are of a height and diameter to be readily received in the combined oven chamber above the meat and in nested, side-by-side relation.

While the vegetable set may be supported in any suitable manner, this may be conveniently accomplished, for certain kinds of cooking, by an element capacitated to serve as a cover or lid for the meat pan and as a support for the vegetable set. As here shown as an example, there is provided a combined support and lid 54 having a rim 55 formed to fit over the rim of the meat pan 47 (Fig. 1) and having an annular flat bead 56 on which the vegetable containers may be supported. In the space within this bead is a folding handle 57. The combined support and lid may be clamped in place by catches 58 carried by the meat pan and engaging the top of the lid (Fig. 1). For cooking so-called pot-roast dinners and New England boiled dinners, and the like, the oven-kettle is placed on the base; the meat pan, carrying the meat supported on the grid 49, is placed in the oven-kettle; the lid 54 is secured in place on the meat pan; the vegetable set is supported on the lid 54; and the oven chamber is completed by the oven-hood seating on the shoulder of the oven-kettle. This arrangement of the parts is illustrated in Fig. 1.

The arrangement just described provides for cooking meat in a closed container. In order to enable meat to be cooked in the combined oven simultaneously with vegetables, but in an open container, means is provided for supporting the vegetable set without the lid 54. This may be accomplished, for example, by suspending a rack, having a gridlike platform, above the meat pan for supporting the vegetable set, and in structures embodying the invention to the best advantage this rack is capacitated to serve as a support in various other arrangements of the principal cooker elements. Although the supporting platform is capable of various constructions, in the embodiment here illustrated as an example (Fig. 8), the rack comprises a substantially circular wire frame piece 59 of a diameter less than the diameter of the oven-kettle and oven-hood. To this frame there is secured, by soldering or otherwise, a number of straight cross bars 60. Adjacent the center, the cross bars, instead of straight wires are formed by a closed loop 61 the ends of which extend outwardly beyond the periphery of the frame 59 for a purpose later described. Below the cross bars and substantially at right angles thereto is a rib 62, the ends of which extend outwardly beyond the periphery of the frame 59. The parts described form a grid-like platform either side of which is adapted to serve as a support. For convenience of description, the side of the platform opposite ribs 62 may be considered the top.

This platform may be suspended just above the rim of the meat pan, to support the vegetable set, by means of shouldered legs which also serve to support the rack elsewhere. To this end, the rack structure here shown is provided with two pairs of legs 63 extending downwardly from the under side of the platform. Each pair is formed by a wire having its hooked ends soldered, or otherwise secured, to the circular frame piece 59. The legs and the crosspiece, later described, of each pair, lie in a plane cutting a cord of the circle of frame piece 59 and substantially perpendicular to the frame thereof. The legs 63 of each pair are offset to provide oppositely faced shoulders 64. The legs of each pair are so spaced and the two pair of legs are so spaced and the shoulders so arranged that the shoulders can seat on the rim of the meat pan with the legs making a close sliding fit with the inner surface thereof to center the rack structure in position. Thus the rack platform is suspended (Fig. 9) just above the rim of the meat pan to serve as a support for the vegetable set. For roasting beef or other meats in an open container simultaneously with three vegetables or less, the parts are arranged as in Fig. 1 except that the lid 54 of the meat pan is discarded and the rack substituted for supporting the vegetable set. This arrangement is illustrated in Fig. 9 except that grid 49 is omitted for convenience of illustration. It is noted that in this arrangement the legs 63 not only serve to center the rack structure but are positioned to take up substantially no room in the meat pan.

It may sometimes be desirable to utilize the entire radial capacity of the oven-kettle for cooking meats too large for the meat pan. Means is provided, therefore, for supporting the vegetable set in the upper part of the combined oven chamber without the use of the meat pan. This may be accomplished, for example, by suspending the rack structure by means of cooperating suspension elements associated with the rack and the oven elements respectively.

As here shown as an example, a supplemental suspension ring 65 is provided. This ring has, at the top (Fig. 14), an outwardly turned flange or lip 66 of a diameter to seat on the shoulders 46 of the oven-kettle between that shoulder and the rim of the oven-hood, the ring being thus suspended within the kettle rim. When the oven-hood is in place, its rim is received directly by the lip 66 of the ring, but the lip is thin and the oven-hood is supported by the oven-kettle substantially as if the ring were not present. To support the rack, the supplemental ring 65 has an inturned lip or flange 67 for receiving the suspension elements of the rack. In the present embodiment these are provided by the ends of rib 62 and the ends of loop 61 which extend out beyond the frame piece 59, as above described. With the supplemental ring in place and the rack suspended by means of its suspension elements seating on lip 67, the rack platform is positioned to support the vegetable set without the use of the meat pan. This leaves a space below the platform for the meat to be cooked. For this cooking operation the meat is placed directly in the oven-kettle, either with or without the use of grid 49; the rack is suspended on the supplemental ring; the vegetable set and the oven-hood being supported as formerly. This arrangement is illustrated in Fig. 4, the vegetable set being omitted for convenience of illustration. In this arrangement the oven-kettle serves directly as the meat container and enables the simultaneous cooking of three vegetables or less and a roasting beef, ham or bird too large for the meat pan.

Provision is made for cooking meats, either in an open or closed container, in an oven open to air circulation. In the embodiment illustrated, the oven chamber is formed by the oven-hood and base, as above described. While the meat may be supported in any suitable manner, this may be conveniently accomplished by means of the meat pan 47 which, as above stated, is dimensioned to be received by the open oven chamber described. For cooking stews, fricassees, goulashes, chicken pot pies, and the like, the food to be cooked is placed in the meat pan 47, either with or without the use of grid plate 49, and the pan is closed by means of lid 54. The meat pan is seated on the hot-plate, its feet 48 elevating it to permit heat circulation, and the oven-hood is seated on the base to complete the open oven chamber as above described. This arrangement of the parts is illustrated in Fig. 7. For straight roasting of ham, chicken and other meats, the meat is supported on grid plate 49 in meat pan 47 and the pan placed in the open oven chamber in the manner just described except that the lid 54 is not used.

Provision is made for baking pie, cake, muffins and the like. In the present embodiment the baking oven is the open oven above described, formed by the oven-hood seated on the shoulder 24 of the base, as in the case of the roasting oven. Means is provided for suitably supporting articles to be baked in this open oven chamber and in structures embodying the invention to the best advantage this supporting means is available for use with utensils of the usual domestic equipment. This may be accomplished conveniently by supporting the rack platform, already described, above the hot-plate. In connection with such a rack, there is provided elevating supporting means such that the rack is readily centered in the oven chamber. Although capable of various constructions, in that here shown as an example, the legs 63 of each pair (Figs. 8 and 12) are bent back with a reverse inward curve to form loops 68 and the inner ends of the loops are connected by horizontal cross piece 69. In the construction shown, the legs of each pair, and their loops and cross piece are formed from a single piece of wire which provide a roughly U-shaped elevating support for the platform. The parts are so arranged that the two cross pieces 69 are spaced apart a distance substantially less than the diameter of the hot-plate, whereby they may seat on the hot-plate to support the platform in an elevated position. Further, the four loops 68 are so arranged that they engage the prominent edge of the hot-plate and serve as positioning stops to hold the rack structure in centered position. Fig. 12 illustrates the rack in position on the hot-plate. The rack described provides a platform for suitably supporting pie pans, cake pans and the like. Further, with the support described, the cooker is available for pie pans, cake pans and the like of standard type, that is, of ordinary domestic equipment, and for individual muffin cups in any desired number up to the supporting capacity of the platform.

Means is provided for centering the supported articles on the rack platform and in structures embodying the invention to the best advantage stop lugs are provided that may also serve to support the rack in inverted position for a purpose to be described. As here shown as an example, the wire frame piece 59, at four spaced points, is bent upwardly (Fig. 8) on the upper side of the platform, to form loops or stop lugs 70. While these stop lugs do not necessarily engage the utensils supported by the platform, they serve to keep these utensils more or less in centered position and prevent them from becoming dislodged. Thus they center the pans supported in the baking oven chamber and the vegetable set supported in the combined oven chamber.

Fig. 6 illustrates the rack mounted on the hot-plate and supporting a pie pan 71 indicated in broken lines, the open chamber being formed by the oven-hood seated on the base. For baking cake, muffins or the like, pans suitable for the purpose are substituted for pie pan 71.

Cookers embodying the invention in its entirety are constructed to be readily available for broiling. With the base and heater described, this is accomplished by suitably supporting the food to be broiled and inverting the base thereover to place the exposed hot-plate in proximity to the food. While the food carrier may vary in construction, it may conveniently be a supplemental pan adapted to support the inverted base. While such a pan may be supported in various ways in structures embodying the invention to the best advantage, the pan is supported by the oven-kettle. In the embodiment here illustrated as an example, there is provided a supplemental pan 72 that is relatively shallow as compared with the oven-kettle. The rim of this pan is doubly offset (Fig. 11) to form two stepped concentric shoulders 73, 74. The outer shoulder 74 is of a diameter to receive the rim 23 of the base when the latter is inverted. The inner shoulder 73 is of such diameter that its under side can seat on the shoulder 46 of the oven-kettle. The oven-kettle being supported on a table or the like, the supplemental pan is supported on the oven-kettle by suspending it on shoulder 46, and the base is inverted and its rim 23 seated on shoulder 74 of the supplemental pan. This arrangement, which is illustrated in Fig. 11, places the hot-plate in a position to broil food carried by the supplemental pan, which acts as a support and a drip pan. The supplemental pan, in turn, is suspended on the rim of the oven-kettle which not only serves as a support but provides a warming oven chamber 75 below the supplemental pan, in which vegetables, or the like, previously cooked, may be kept warm during the broiling operation.

Means is provided for suitably supporting the food to be broiled in the supplemental pan. This may be accomplished by a grid capacitated to be elevated slightly above the bottom of the supplemental pan and in structures embodying the invention to the best advantage, the platform of the rack already described serves as such a grid. As above stated, the loops or stop lugs 70 are capacitated to serve as elevating feet. For broiling, the rack is inverted and the loops 70 seated on the bottom of the supplemental pan, thus serving as feet to support the rack platform in a position slightly above the pan bottom. So positioned, the reverse side of the rack platform becomes a grid for the food to be broiled. The parts are so arranged that there is room in the broiling oven space, formed between the supplemental pan and the base, for the inverted legs of the rack. In this position (Fig. 11) the legs of the rack perform no function except that in some instances they may serve to position the food supported on the grid-like platform.

Provision is made for cooking baked fish, meat loaf, fish a la creole and other operations of the dry roasting type in which a small closed oven chamber is desired. This may be accomplished, for example, by an element adapted to receive the oven-hood to form the oven chamber and constructed to cut off the air circulation through perforations 25. In the embodiment here illustrated this is effected by means of the supplemental pan 72. As here shown, the bottom of pan 72 is provided with elevating feet 76 similar to the feet 48 of the meat pan and similarly formed. The supplemental pan is seated by means of these elevating feet 76 on the hot-plate. The inner shoulder 73 of the supplemental pan is dimensioned to receive the rim of the oven-hood. With the supplemental pan seated on the base and the oven-hood seated on shoulder 73 of the pan, there is provided a roasting oven chamber closed to air circulation through perforations 25, feet 76 elevating the supplemental pan to permit heat circulation under the same. This arrangement is illustrated in Fig. 10.

While the meat or other food to be cooked in this dry roasting oven may be supported in various ways, in the embodiment here illustrated, this is accomplished by means of the rack already described, which is inverted and supported on the bottom of the supplemental pan in the same manner as for broiling operations.

There is provided a partition for dividing the combined oven chamber, formed by the oven-kettle and the oven-hood, into a lower cooking chamber and an upper warming chamber. In the present embodiment this is accomplished by means of the supplemental pan 72 already described. With the oven-kettle seated on the hot-plate, the supplemental pan is suspended on the shoulder 46, as in the broiling arrangement, and the oven-hood is seated on shoulder 73, as in the dry roasting arrangement. The supplemental pan thus partitions the combined oven chamber into a lower cooking chamber and an upper warming chamber in which food, supported by the supplemental pan, may be kept warm while other food is cooking. This arrangement is not specifically illustrated as it will be clear from Figs. 10 and 11 in connection with the description.

Provision is made for supporting milk bottles in the combined oven chamber for sterilizing, and Mason jars for canning. This may be accomplished by means of the rack above described. The reverse bends or loops 68 forming part of the supporting legs of the rack are constructed so that they may serve as supporting feet to support the rack platform in the oven-kettle. With the loops 68 seated on the bottom of the oven-kettle, the rack platform is positioned to support articles in the combined oven chamber. This arrangement is illustrated in Fig. 5 in which a milk bottle 77 and a Mason jar 78, indicated in broken lines, are shown supported on the rack platform. It will be apparent that as many milk bottles or as many Mason jars as the platform will accomodate may be treated simultaneously.

The principal and supplemental parts above described are capable of various other arrangements and uses not specifically illustrated. For example, the supporting base and hot-plate may be used alone as an open stove. This makes the hot-plate available for boiling water, frying and other operations, ordinary domestic equipment being used. As another example, the oven-kettle seated on the hot-plate, as in Fig. 1, but without the oven-hood, provides a large open-topped receptacle for use in preserving and the like. As a further example, vegetables cooked in the vegetable set may be kept warm during other cooking operations by seating the vegetable containers on the lid 54, supported on a table or the like, and covering them with the oven-hood. Other arrangements and uses are possible.

The cooker described is compact, is readily portable, is readily available for use, and is capable of substantially all domestic cooking requirements.

What we claim is:

1. A cooker comprising a supporting base, an exposed hot-plate carried by the base, a shouldered wall on the base outside the periphery of the hot-plate, an oven kettle adapted to be removably supported upon the hot-plate and having a shouldered top rim, the two shoulders being of substantially the same diameter, and an oven-hood having a bottom rim of a size to seat on said shoulders, whereby the oven-hood may seat on the oven-kettle when the latter is in place or on the base when the oven-kettle is removed.

2. In a cooker, in combination with a supporting base, an exposed prominent hot-plate carried thereby, means for heating said hot-plate, and a removable oven-kettle having its bottom dished inwardly to take over the hot-plate, the base having air openings supported by the base.

3. A cooker comprising a supporting base, a hot-plate carried by the base, a shouldered wall on the base outside the periphery of the hot-plate when the oven-kettle is to be between the hot-plate and said wall, an oven-kettle adapted to be supported upon the hot-plate and having a shouldered top rim, said two shoulders being of substantially the same diameter, and an oven-hood having a bottom rim of a size to seat on said shoulders, whereby the oven-hood may be associated with the oven-kettle, when the latter is in place, to form a combined oven chamber closed to air circulation, and with the base, when the kettle is removed to form an oven chamber open to air circulation.

4. A cooker comprising a supporting base, an exposed prominent hot-plate carried thereby, the base having a perforated base-plate surrounding said hot-plate and a shouldered wall surrounding said base plate, a removable oven-kettle having its bottom dished inwardly to take over said hot-plate and be supported on said hot-plate, said oven-kettle having a shouldered rim, and a separable oven-hood, the said shoulders corresponding in diameter to the rim of said oven-hood whereby the oven-hood may seat on the oven-kettle, when the latter is in place, to provide an oven chamber closed to said perforations, or on the shoulder of the base, when the oven-kettle is removed, to provide an oven chamber open to said perforations.

5. In combination, a base for a cooker comprising an annular perforated base plate, a shouldered wall extending upwardly from the periphery thereof, a cupped holder within the annulus of the plate, and a plurality of supporting legs, a combined housing and support carried by said cupped holder, a hot-plate mounted on said support to be above the plane of the perforated plate, and electric resistance elements housed by the hot-plate and said housing for heating the hot-plate.

6. A cooker comprising a supporting base having a shouldered rim, an exposed hot-plate carried by said base, a removable oven-kettle having a shouldered rim and adapted to be supported by said base, a separable oven-hood, said shoulders corresponding in diameter to the rim of the oven-hood whereby the latter may seat on the shoulder of the oven-kettle, when the latter is in place, to provide a combined oven chamber for steaming or boiling or on the shoulder of the base, when the oven-kettle is removed, to provide an oven chamber for roasting or baking, and a supplemental pan having a doubly offset rim providing two shoulders, one shoulder having a diameter whereby the supplemental pan may be suspended on the shoulder of the oven-kettle and receiving the rim of the oven-hood, the other shoulder having a diameter to receive the rim of the inverted base, whereby the combined oven chamber may be divided into a lower cooking space and an upper warming space or the oven-kettle may support the supplemental pan with the base inverted thereon to place the hot-plate in a position for broiling food contained in said supplemental pan.

7. A cooker comprising a supporting base, a heating element associated therewith, an oven-kettle adapted to be removably supported by said base and having a shouldered rim, a separable oven-hood having a bottom rim for seating on said shoulder, and a partition element having a shouldered rim, said shoulder being dimensioned so that the partition element may be suspended on the shoulder of the oven-kettle and may receive the rim of the oven-hood, whereby, when the partition element is inserted between the oven-kettle and oven-hood there is provided a lower cooking chamber and an upper warming chamber.

8. In a cooker in combination with a supporting base having an annular rim, a heating element associated with said base, an oven element adapted to be removably supported by the base and having an open top provided with a shouldered rim, a supplemental pan having a doubly shouldered rim and adapted to be suspended on the shoulder of said oven element and to receive the rim of the inverted base, the oven element serving as a support when the base is inverted.

9. A heating device comprising an exposed hot-plate, a base which carries the hot-plate, and a peripheral wall on the base having a shoulder capacitated to receive and support an oven element and a rim adapted to be received by a support to support the device in inverted position.

10. In a cooker, in combination with a supporting base, a hot-plate carried thereby, a separable oven-hood capacitated to seat on the base to provide an oven chamber, and a rack comprising a platform for supporting food-containing pans within said chamber, legs for elevating the platform portion a substantial distance above the hot-plate, and cross pieces on said legs for seating on the hot-plate to support the platform.

11. In a cooker, in combination with a supporting base, a hot-plate carried thereby, a separable oven-hood capacitated to seat on the base to provide an oven chamber, and a rack comprising a platform for supporting food-containing pans within said chamber, legs for elevating the platform portion a substantial distance above the hot-plate, cross pieces on said legs for seating on the hot-plate to support the platform, and positioning stops associated with the legs and cross pieces for engaging the edge of the hot-plate to hold the rack in centered position.

12. In a cooker, in combination with a supporting base, a round prominent hot-plate carried thereby, and a rack comprising a platform for supporting food-containing pans, two pair of elevating legs, cross pieces connecting the legs of each pair and spaced apart a distance substantially less than the diameter of the hot-plate, thereby to be capacitated to seat thereon to support the platform, the legs being provided with reverse bends forming loops extending below and outside of the cross pieces and arranged to engage the prominent edge of the hot-plate to hold the rack in centered position.

13. A cooker comprising a supporting base, a prominent hot-plate carried thereby, an oven-kettle adapted to be supported by the base, an oven-hood adapted to be supported on the oven-kettle, when the latter is in place, and on the base when the kettle is removed, a rack comprising a platform for supporting food containers, two pair of elevating legs, cross pieces connecting the legs of each pair and spaced apart a distance substantially less than the diameter of the hot-plate, thereby to be capacitated to seat thereon to support the platform when the oven-kettle is removed, the legs being provided with reverse bends forming loops extending below and outside of the cross pieces and arranged to engage the edge of the hot-plate to hold the rack in centered position and capacitated to serve as feet to support the rack in the oven-kettle.

14. A cooker comprising a supporting base, a hot-plate carried thereby, an oven-kettle adapted to be removably supported by the base, an oven-hood adapted to seat on the kettle to form a combined oven chamber, or on the base, when the oven-kettle is removed, to form a single oven chamber, a food-containing pan for reception in the oven-kettle, and a rack comprising a platform and means for elevating the platform above the hot-plate to support utensils in the single oven chamber and for suspending the platform adjacent the rim of the pan to support utensils in the combined oven chamber above the pan.

15. A cooker comprising a supporting base, a hot-plate carried thereby, an oven-kettle adapted to be removably supported by the base, an oven-hood adapted to seat on the kettle to form a combined oven chamber, or on the base, when the oven-kettle is removed, to form a single oven chamber, a rack comprising a platform, means for elevating the platform above the hot-plate to support utensils in the single oven chamber, and suspension elements, and means removably associated with the oven-kettle for receiving said suspension elements to suspend the platform in a position to support utensils in the upper part of the combined oven chamber.

16. A cooker comprising a supporting base, a hot-plate carried thereby, an oven-kettle adapted to be removably supported by the base, an oven-hood adapted to seat on the kettle to form a combined oven chamber or on the base, to form a single oven chamber, a rack comprising a platform, legs for elevating the platform above the hot-plate to support utensils in the single oven chamber, positioning stops associated with said legs to engage the edge of the hot-plate to hold the rack in centered position, and suspension elements, and means removably associated with the oven-kettle for receiving said suspension elements to suspend the platform in a position to support utensils in the upper part of the combined oven chamber, said stops being adapted to serve as feet to support the rack structure on the bottom of the oven-kettle.

17. A cooker comprising a supporting base, a heating element associated therewith, means for forming an oven chamber associated with the heating element, a meat pan for reception in said oven chamber, a plurality of vegetable containers for reception in said oven chamber with the meat pan, for the simultaneous cooking of meat and vegetables, a removable cover for the meat pan having a portion for receiving the vegetable containers to support the same in the oven chamber when the cover is in place, and a rack comprising a platform and means by which the platform may be suspended on the rim of the meat pan to support the vegetable containers when the cover is removed.

18. A cooker comprising a supporting base, a heating element associated therewith, means for forming an oven chamber associated with the heating element, a meat pan for reception in said oven chamber, a plurality of vegetable containers for reception in said oven chamber with the meat pan, for the simultaneous cooking of meat and vegetables, a rack comprising a platform, shoulders for engaging the rim of the meat pan to suspend the platform above the latter for supporting the vegetable containers in the oven chamber, and suspension elements, and a cooperating suspension device removably associated with the oven-forming means for receiving said suspension elements and suspending the platform in a position to support said vegetable containers when the meat pan is removed.

19. In a cooker, in combination with a supporting base, a heating element carried thereby, an oven-kettle adapted to be supported by the base and having a shouldered rim, an oven-hood having a rim capacitated to be supported by said shoulder to provide an oven chamber, a removable ring having an out-turned lip for seating on the said shoulder between the latter and the rim of the oven-hood to suspend the ring adjacent the rim of the oven-kettle and an inturned lip, and a rack comprising a grid-like platform and suspension elements for seating on said in-turned lip to suspend the platform in the oven chamber for supporting utensils therein.

20. In a cooker, in combination with a supporting base, a heating element carried thereby, means for forming an oven chamber associated with said heating element, a pan for reception by said oven chamber, a rack comprising a grid-like platform, a plurality of legs extending downwardly from the platform and arranged to engage the inner side of the pan to hold the rack in centered position, and shoulders between the legs and the platform for seating on the rim of the pan to suspend the platform thereon, whereby the platform may support food containers above the pan.

21. A rack for a cooker comprising a grid-like platform, suspension elements associated with the platform for suspending the same from a suitable support, a pair of U-shaped wires secured to said platform, the legs of said wires being offset near the platform to provide suspension shoulders and having reverse bends below the cross pieces forming loops for serving as positioning stops and supporting feet, and lugs on the opposite side of the platform for centering articles thereon and serving as supporting feet when the rack is inverted.

22. A cooker comprising a supporting base, a heating element carried thereby, said base having provision for air circulation, an oven element adapted to be supported on the base to form an oven chamber open to said air circulation, and a supplemental pan adapted to be supported by the base and to support the oven element to provide an oven chamber closed to said air circulation.

23. A cooker comprising a supporting base having a perforated base plate and a shouldered wall extending upwardly from the outer edge thereof, a heating element carried by the base, an oven-hood having a rim for seating on said shoulder to provide an oven chamber open to said perforations, and a supplemental pan adapted to be supported by the base and having a rim provided with a shoulder for receiving the rim of the oven-hood to form an oven chamber closed to said perforations.

24. A cooker comprising a supporting base having a perforated base plate and a shouldered wall extending upwardly from the outer edge thereof, a hot-plate carried by the base, an oven-hood having a rim for seating on said shoulder to provide an oven chamber open to said perforations, and a supplemental pan having a plurality of struck-up knobs on its bottom surface adapted to seat on the hot-plate to support the pan in elevated position and having a rim provided with a shoulder for receiving the rim of the oven-hood to form an oven chamber closed to said perforations.

25. A cooker comprising a supporting base having a perforated base plate and a shouldered rim outside said base plate, a hot-plate carried by said base, an oven-kettle adapted to be supported by the base and having a shouldered rim, an oven-hood having a rim adapted to seat on the shoulder of the kettle when the latter is in place to provide an oven chamber closed to said perforations and on the shoulder of the base when the kettle is removed to provide an oven chamber open to said perforations, and a supplemental pan having a plurality of struck-up knobs on its bottom surface for seating on the hot plate to support the pan in elevated position when the oven-kettle is removed and having a rim provided with two annular shoulders, one being dimensioned to receive the rim of the oven-hood to provide a closed oven chamber when the pan is supported on the hot-plate and to permit the pan to be suspended on the shoulder of the oven-kettle, the other being dimensioned to receive the rim of the inverted base when the pan is so suspended, the oven-kettle serving as a support when the base is inverted.

26. A cooker comprising a supporting base having a perforated base plate and an annular rim provided with a shoulder, a hot-plate carried by the base, an oven-hood having a rim for seating on said shoulder to provide an oven chamber open to said perforations, a supplemental pan adapted to be supported by the base and having a rim provided with a shoulder of substantially the same diameter as the shoulder of the base, whereby the pan shoulder may receive the rim of the oven-hood to provide an oven chamber closed to said perforations, and a rack comprising a platform, supporting elements for seating on the hot-plate to support the platform in the first mentioned oven chamber and supporting elements for seating on the bottom of the supplemental pan to support the platform in the second named oven chamber.

27. A cooker comprising a supporting base having a perforated base plate and a shouldered rim, a hot-plate carried by the base, an oven-kettle adapted to be supported by the base and having a shouldered rim, an oven-hood having a rim for seating on said shoulder when the oven-kettle is in place and on the shoulder of the base when the oven-kettle is removed, a supplemental pan adapted to be supported by the base when the oven-kettle is removed and having a rim provided with a shoulder for receiving the rim of the oven-hood, said shoulder also being capacitated to suspend the supplemental pan on the shoulder of the oven-kettle, the supplemental pan having a second shoulder dimensioned to receive the rim of the inverted base when the pan is suspended on the oven-kettle, the oven-kettle serving as a support when the base is inverted, and a rack comprising a platform, legs for supporting the platform from the hot-plate when the oven-hood is seated on the base, and supporting elements for supporting the platform from the bottom of the supplemental pan when the latter is supported by the base or suspended on the oven-kettle.

28. A cooker comprising a supporting base having a shouldered rim, a hot-plate carried thereby, an oven-kettle adapted to be supported by the base and having a shouldered rim, an oven-hood for seating on the shoulder of the oven-kettle when the latter is in place or on the base shoulder when the oven-kettle is removed, a supplemental pan having a rim provided with two shoulders, one dimensioned to permit the pan to be suspended on the shoulder of the oven-kettle, the other being dimensioned to receive the rim of the inverted base, the oven-kettle serving as a support when the base is inverted, and a rack comprising a platform, legs for supporting the platform from the hot-plate when the oven-hood is seated on the base, and supporting elements for supporting the platform in inverted position on the bottom of the supplemental pan when the latter is suspended on the oven-kettle.

29. A cooker comprising a supporting base having a shouldered rim, a hot-plate carried thereby, an oven-hood adapted to seat on the shoulder of said base, a supplemental pan having a shouldered rim for receiving the rim of the inverted base, and a rack comprising a platform, legs for supporting the platform from the hot-plate when the oven-hood is seated on the base, and supporting elements for supporting the platform in inverted position in the supplemental pan when the base is inverted thereon.

30. A cooker comprising a supporting base having a shouldered rim, a hot-plate carried thereby, an oven-kettle adapted to be supported by the base and having a rim provided with a shoulder, an oven-hood having a rim for seating on said shoulder, a supplemental pan having a rim provided with two shoulders, one so dimensioned that the supplemental pan may be suspended on the shoulder of the oven-kettle, the other dimensioned to receive the rim of the inverted base, the oven-kettle serving as a support when the base is inverted, a meat pan for reception by the oven-kettle, the supplemental pan being removed, and a rack comprising a platform, means for suspending the platform on the rim of the meat pan to support utensils above the same, and lugs associated with said platform for centering utensils thereon, and capacitated to serve as feet to support the inverted platform in the supplemental pan.

31. A cooker comprising a supporting base having a shouldered rim and a perforated base plate, a prominent hot-plate carried by the base, an oven-kettle adapted to be supported by the base and having a shouldered rim, an oven-hood having a rim for seating on the shoulder of the oven-kettle when the latter is in place, to provide an oven chamber closed to said perforations and on the shoulder of the base when the oven-kettle is removed to provide an oven chamber open to said perforations, a meat pan for reception in the closed oven chamber, a supplemental pan having a rim provided with two shoulders, one dimensioned to permit the supplemental pan to be suspended on the shoulder of the oven-kettle, the other to receive the rim of the inverted base, the oven-kettle serving as a support when the base is inverted, and a rack comprising a platform, legs for supporting the platform from the hot-plate in said open oven chamber, said legs having shoulders for suspending the platform on the rim of said meat pan in the closed oven chamber, and lugs associated with the platform for centering utensils supported thereon, said lugs serving to support the inverted platform in said supplemental pan when the latter is suspended on the oven-kettle to receive the inverted base.

32. A cooker comprising a supporting base having a shouldered rim, a hot-plate carried thereby, an oven-kettle adapted to be supported on the hot-plate and having a shouldered rim, an oven-hood having a rim for seating on the shoulder of the oven-kettle when the latter is in place, to provide a combined oven chamber and on the shoulder of the base when the oven-kettle is removed, to provide a single oven chamber, and a meat pan dimensioned to be received by either oven chamber and having in its bottom a plurality of struck-up knobs for seating on the bottom of the kettle or on the hot-plate to elevate the pan in one chamber or the other.

33. A cooker comprising a supporting base having a shouldered rim, a hot-plate carried thereby, an oven-kettle adapted to be removably supported on the hot-plate and having a shouldered rim, an oven-hood having a rim for seating on the shoulder of the oven-kettle, when the latter is in place, to provide a combined oven chamber and on the shoulder of the base, when the oven-kettle is removed, to provide a single oven chamber, and a rack comprising a platform, means for supporting the platform in said single oven chamber and means by which the platform may be suspended in said combined oven chamber.

In testimony whereof, we have hereunto set our hands.
CHARLES F. SMITH.
CHARLES EDWARDS.

CERTIFICATE OF CORRECTION.

Patent No. 1,624,989.   Granted April 19, 1927, to

CHARLES F. SMITH ET AL.

It is hereby certified that error appears in the printed specification of the above numbered patent requiring correction as follows: Page 3, line 93, for the word "frame" read "plane"; page 6, line 56, claim 2, strike out the words "the base having air openings" and insert instead the words "when the oven-kettle is to be"; same page, line 61, claim 3, strike out the words "when the oven-kettle is to be" and insert instead ", the base having air openings"; and that the said Letters Patent should be read with these corrections therein that the same may conform to the record of the case in the Patent Office.

Signed and sealed this 14th day of June, A. D. 1927.

Seal.

M. J. Moore,
Acting Commissioner of Patents.